(12) United States Patent
Choi

(10) Patent No.: US 6,502,164 B1
(45) Date of Patent: Dec. 31, 2002

(54) APPARATUS AND METHOD FOR TRANSMITTING DATA OF DISK RECORDING MEDIUM

(75) Inventor: Cheol Young Choi, Suwon (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 09/662,031

(22) Filed: Sep. 14, 2000

(30) Foreign Application Priority Data

Sep. 14, 1999 (KR) .............................................. 99-39411

(51) Int. Cl.⁷ .......................... G06F 12/00; G06F 12/14; G06F 12/16
(52) U.S. Cl. .......................... 711/112; 711/153; 711/173
(58) Field of Search ................................ 711/153, 154, 711/156, 173

(56) References Cited

U.S. PATENT DOCUMENTS

| | | | | |
|---|---|---|---|---|
| 4,780,815 A | * | 10/1988 | Shiota ........................ | 364/200 |
| 5,485,439 A | * | 1/1996 | Hamasaka et al. ............. | 369/47 |
| 5,727,232 A | * | 3/1998 | Lida et al. .................. | 395/876 |
| 6,160,778 A | * | 12/2000 | Ito et al. ....................... | 369/54 |
| 6,301,203 B1 | * | 10/2001 | Maeda et al. ................. | 369/32 |

* cited by examiner

Primary Examiner—Hong Chong Kim
Assistant Examiner—Ngoc Dinh
(74) Attorney, Agent, or Firm—Birch Stewart Kolasch & Birch LLP

(57) ABSTRACT

A method for transmitting a data of a disk recording medium including: a first step of reading file management information for managing a data recorded in a file structure in a disk recording medium; a second of storing the read file management information in a storing unit different to the recording medium; and a third step of reading and transmitting a corresponding file management information as stored in the storing unit when the file management information is requested. By doing that, the file management information that is frequently requested to be transferred, such as a file system data managing a data in a file structure recorded in a disk recording medium such as a CD-ROM, is stored in a specific storing area so as to be quickly read and transmitted to a connected instrument such as a personal computer, without performing a tracking servo operation to drive a sled motor. Thus, the transfer rate of the optical disk driver such as the CD-ROM can be highly improved.

15 Claims, 4 Drawing Sheets

BUFFER RAM
(NO SEGMENTATION)

APPARATUS AND METHOD FOR TRANSMITTING DATA OF DISK RECORDING MEDIUM

BACKGROUND OF THE INVENTION

1. Field of the Invention

The present invention relates to an apparatus and method for transmitting a data of a disk recording medium in which a data is read from a disk recording medium such as a CD-ROM and transmitted to a connected instrument such as a personal computer.

2. Description of the Background Art

FIG. 1 is a schematic block diagram showing a construction of a general optical disk drive such as a CD-ROM drive.

As shown in the drawing, the CD-ROM drive includes an optical pick-up 2 for reading a signal recorded in the optical disk 1 such as a CD-ROM; a wave-filtering/shaping unit (RF) 3 for wave-filtering/shaping an RF signal read by the optical pick-up and outputting a binary signal; a digital signal processing (DSP) unit 4 for restoring the binary signal to digital data; an interface unit 5 for transmitting the restored digital data to a connected host instrument such as a personal computer; a sled motor 11 for moving the optical pick-up 2; a spindle motor 12 for rotating the optical disk 1; a driver 7 for driving the sled motor 11 and the spindle motor 12 to be rotated; a servo unit 6 for controlling the optical pick-up 2 and the driver 7; a MICROCOMPUTER 8 for controlling operations of the servo unit 6 and the digital signal processing unit 4; a system memory 9 for storing TOC (Top of Content) information on the optical disk and providing data required for controlling operation of the MICROCOMPUTER; and a buffer memory 10 such as a buffer RAM for temporarily storing the restored data.

The system memory 9 and the buffer memory 10 include a RAM, a volatile memory that resets previously stored data and information to store new data and information.

The operation of the CD-ROM drive, especially, the data transfer operation to transfer a data to the personal computer, constructed as described above will now be explained with reference to FIG. 2.

FIG. 2 is a flow chart of the method of transferring a data in the general optical disk driver, that is, a CD-ROM drive in accordance with a conventional art.

First, in a state that the CD-ROM drive and the personal computer (PC) are connected through the interface unit 5 (S10), when the MICROCOMPUTER 8 receives a transfer request command requesting data transfer from the optical disk 1 to the personal computer (S11), it performs a tracking servo operation to move the optical pick-up 2 to a recording position on the disk where a corresponding data has been recorded, to read the corresponding data as requested and transfer it. The tracking servo operation is performed by rotational driving of the sled motor 11 that horizontally moves the optical pick-up 2 according to a driving voltage applied from the driver 7. Owing to the tracking servo operation, the optical pick-up 2 is moved to the recording position where the corresponding data has been recorded (S12), and the buffer memory 10 for temporarily storing a decoded data is reset to perform clearing operating to clear a previously stored data (S13).

Thereafter, a data is read from the recording position as the optical pick-up has been moved thereto, that is, from the recording position of the optical disk where a specific data as requested was searched. And, the data is read, signal-processed and decoded to its original data. And then, after the decoded data is temporarily stored in the cleared buffer memory 10 (S15), the temporarily stored data is read and transferred to the personal computer PC through the interface unit 5 (S16).

However, as for the personal computer PC connected through the interface unit 5, in order to request a specific data transmission, i.e., transmission of a specific data in a file structure recorded in the CD-ROM, a file system data, that is, management information for managing the specific data in a file structure, is separately recorded in a different recording position from that of the TOC information, that is, list information for the CD-ROM, as shown in FIG. 3.

In addition, unlike the TOC information, in order to read and transfer the file system data, that is, the management information, to an externally connected instrument such as the personal computer, the sled motor 11 is to be driven to move the optical pick-up 2 to the recording position on the disk where the file system data has been recorded. Furthermore, when data are repeatedly requested by the host, which were previously requested by the host, the pick-up is moved again to the position and the data are read and transferred to the host after storing the reproduced data to the buffer RAM 10. At this time, the buffer RAM 10 stores newly this data after deleting the data which was stored previously therein whenever the data are requested by the host. This results from using the buffer RAM 10 as one region. In this case, much time is required for the movement of the optical pick-up, resulting in failing to meet the demand that data transmission be performed quickly. Thus, the data transfer rate, which labels the performance of the CD-ROM drive, is very limited.

SUMMARY OF THE INVENTION

Therefore, an object of the present invention is to provide an apparatus and method for transmitting data of a disk recording medium in which file management information that is frequently requested to be transferred, such as a file system data managing a data in a file structure recorded in a disk recording medium such as a CD-ROM, is stored in a specific storing area so as to be quickly read and transmitted to a connected instrument such as a personal computer, without performing a tracking servo operation to drive a sled motor.

To achieve these and other advantages and in accordance with the purpose of the present invention, as embodied and broadly described herein, there is provided a method for transmitting a data of a disk recording medium including: a first step of reading file management information for managing a data recorded in a file structure in a disk recording medium; a second of storing the read file management information in a storing unit different to the recording medium; and a third step of reading and transmitting a corresponding file management information as stored in the storing unit when the file management information is requested.

Specifically, in the above method, the file management information refers to a file system data including recording position information of the data recorded in the file structure. In the second step, a single memory is segmented into plural storing areas and the file management information is stored in one of the storing areas as segmented, and in the third step, the file management information including the requested information is partially read and transmitted.

In order to achieve the above objects, there is also provided an apparatus for transmitting a data of a disk recording medium in which a data is read from a recording medium in which a data in a file structure and file management information for managing the data in a file structure have been recorded, and transmitted through an interface to a host, including: a reading unit for reading out the data and the management information recorded in the recording medium; a storing unit for storing the file management information read by the reading unit in a different area to the area in which the data in a file structure is stored; and a controller for controlling in a manner that the file management information is read out from the storing unit to be transmitted without performing reading operation by the reading unit, when the host requests the file management information.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
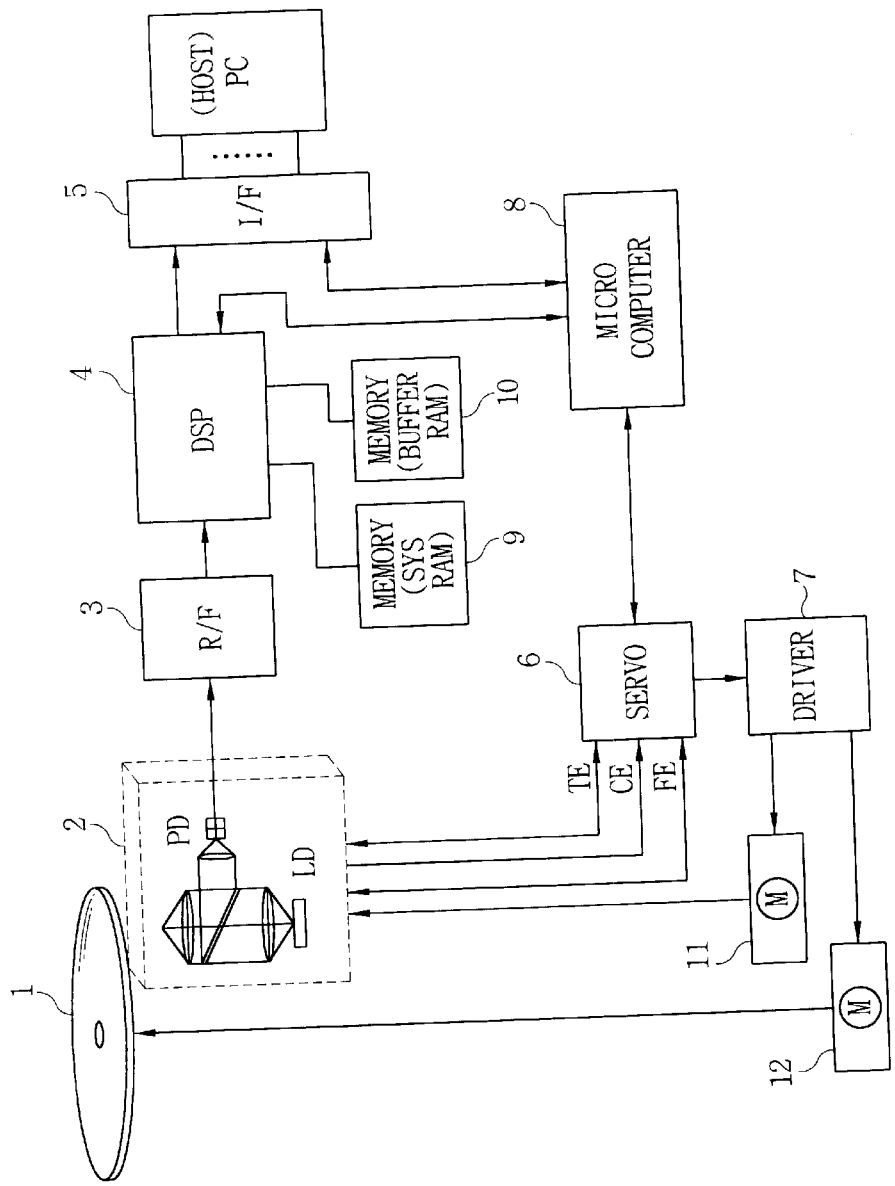
FIG. 1 is a schematic block diagram of a general optical disk drive, that is, a CD-ROM drive, in accordance with a conventional art.
Figure 2:
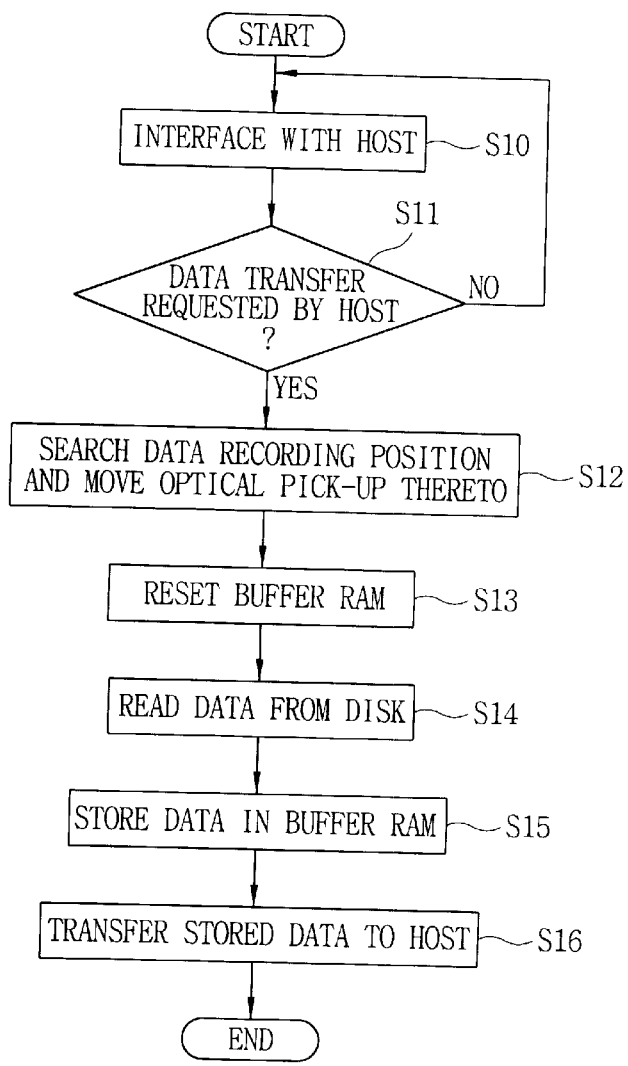
FIG. 2 is a flow chart of a method for transmitting a data of an optical disk drive, that is, a CD-ROM drive, in accordance with the conventional art.
Figure 4A:
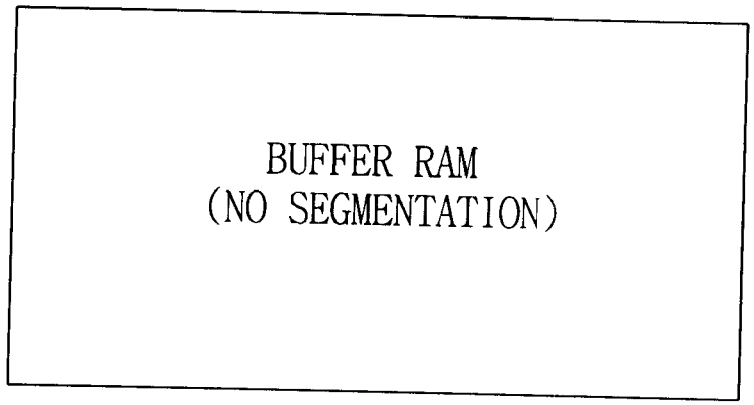
FIGS. 4A and 4B illustrate a construction of a memory segmented into plural storing areas in accordance with an embodiment of the present invention.
Figure 4B:
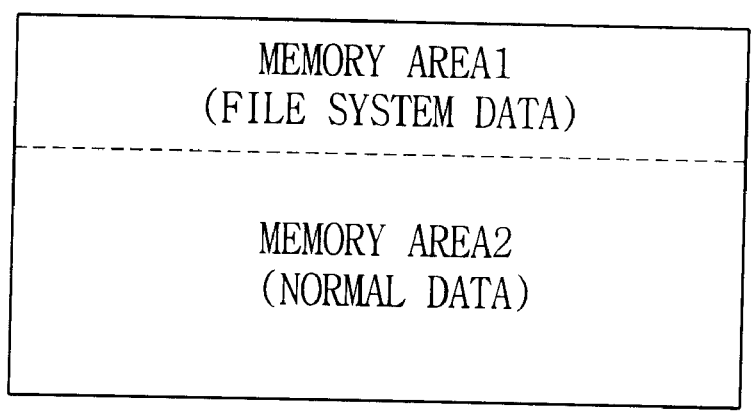

FIG. 4A shows a buffer memory 10 of a general CD-ROM drive or other optical disk drive as shown in FIG. 1, and FIG. 4B shows a conceptually extended buffer memory 10 of the present invention. The present invention is implementable using the optical disk drive as shown in FIG. 1.

As aforementioned, as to the buffer memory of the general CD-ROM drive, the digital data, that is, the data in a file structure and the file system data for managing the file-structured data, restored by the digital signal processing unit 4 are temporarily stored together in a single storing area, that is, in the buffer memory 10. In this case, when the buffer memory 10 is reset, the file-structured data and the file system data are all cleared at one time. Thus, when the CD-ROM drive receives a transfer request command requesting transfer of a file system data from the personal computer (PC) connected through the interface unit 5, it should drive the sled motor 11 to read out and transfer the file system data.

Comparatively, meanwhile, the buffer memory 10 of the present invention is segmented into a first memory area for storing the file system data and a second memory area for storing the file-structured data. Thus, as the file-structured data restored by the digital signal processing unit 4 and the file system data for managing the file-structured data are separately stored in the first and the second memory, in case that a data in a new file structure is read out and stored temporarily, only the second memory area of the buffer memory 10 in FIG. 4B is reset. Therefore, when a transfer request command requesting transfer of the file system data is received from the personal computer or some other device connected through the interface unit 5 or the like, the file system data stored in the first memory area can be quickly read out to be transferred, without requiring driving of the sled motor 11 which takes much time.

The above described method for transmitting a data according to the present invention in which the file system data is separately stored in the first memory area of the buffer memory 10 and read out to be transmitted upon receipt of a transfer request command requesting the file system data from the personal computer or other device, will now be explained in detail with reference to FIG. 5.

Figure 5:
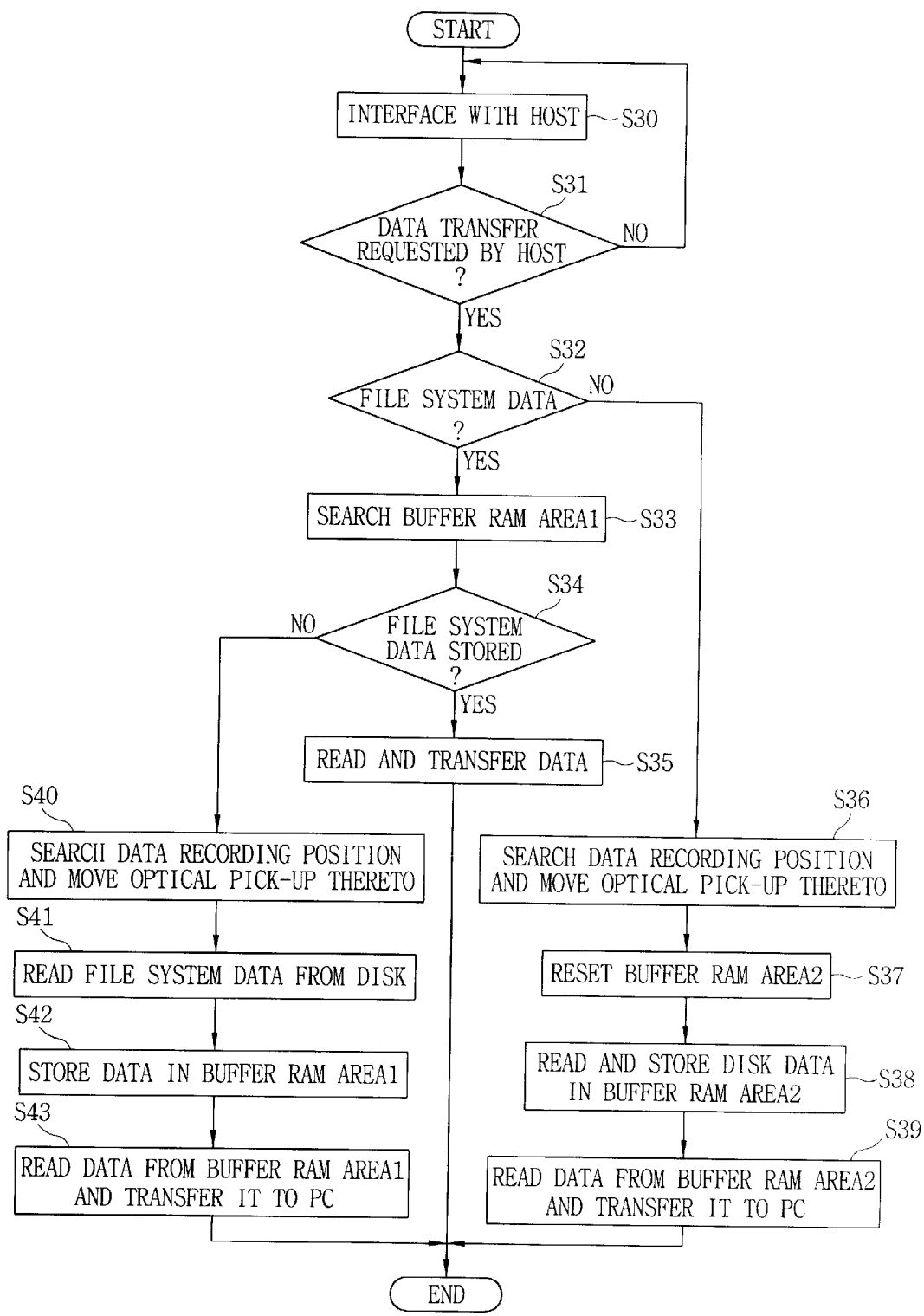
FIG. 5 is a flow chart of a method for transmitting a data of an optical disk driver in accordance with an embodiment of the present invention.

FIG. 5 is a flow chart of a method for transmitting a data of an optical disk driver in. accordance with the present invention.

First, in a state that the optical disk drive is connected with the personal computer through the interface unit 5 (S30), when the optical disk drive receives a transfer request command requesting transfer of a data from the personal computer or some other host device (S31), the MICRO-COMPUTER 8 discriminates whether the file system data for managing the file-structured data is requested (S32). Upon discrimination, in case that the file system data is requested, it searches the first memory region of the buffer memory 10 (S33) to identify whether there is the corresponding file system data in the first memory region (S34).

Upon identifying, in case that the corresponding file system data has been stored in the buffer memory 10, it is read out without performing a tracking servo operation to drive the sled motor 11 and is transmitted to the personal computer through the interface unit 5 (S35). At this time, the file system data may not be wholly transmitted. That is, only the partial file system data including information on the file as requested is transmitted.

Figure 3:
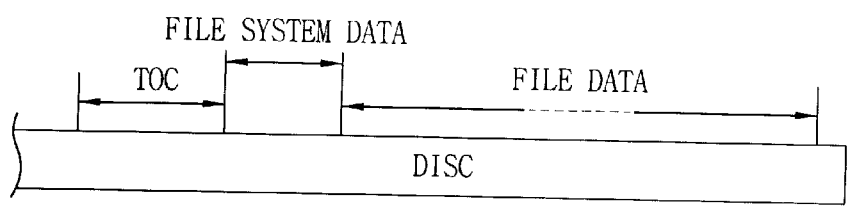
FIG. 3 illustrates information and data recording area recorded on the general CD-ROM.

Meanwhile, upon identifying, in case that the corresponding file system data has not been stored in the buffer memory 10, as shown in FIG. 3, a tracking servo operation is performed to drive the sled motor 11 to move the optical pick-up 2 to the file system data recording region on the disk. And then, the recording position of the disk on which the file system data has been recorded is searched (S40), and a file system data is read out from the searched recording position (S41) of the disk and is stored in the first memory area of the buffer memory 10 (S42). The stored file system data is transmitted to the personal computer connected through the interface unit 5 (S43).

Meanwhile, upon discrimination (S32), in case that the file system data managing the file structured-data is not the requested one, a tracking servo operation is performed to drive the sled motor 11 so as to move the optical pick-up 2 to the recording region where the file-structured data has been recorded on the disk, whereby the recording position on the disk at which the corresponding file-structured data has been recorded is searched (S36) and the file structured-data is read out from the searched recording position on the disk. And, at the same time, clearing operation is performed to reset the previous data temporarily stored in the second memory area of the buffer memory 10 (S37). Thereafter, the file-structured data restored by the digital signal processing unit 4 is temporarily stored in the second memory area of the buffer memory 10 (S38), the stored file-structured data is read out and transmitted to the personal computer through the interface unit 5 (S39).

In this manner, the file management information such as the file system data that is requested frequently by the personal computer connected through the interface is separately stored in a particular memory area like the first memory area of the buffer memory 10 so as to be quickly read out and transmitted upon request of transmission.

In addition, the file management information such as the file system data, or other particular information and data that may be requested frequently by the personal computer can be separately stored in different memories and quickly read out to be transmitted upon request.

As so far described, according to the apparatus and method for transmitting data of a disk recording medium of the present invention, the file management information that is frequently requested to be transferred, such as a file system data managing a data in a file structure recorded in a disk recording medium such as a CD-ROM, is stored in a specific storing area of a buffer memory so as to be quickly read and transmitted to a connected instrument such as a personal computer, without performing a tracking servo operation to drive a sled motor. Thus, the transfer rate of the optical disk drive such as the CD-ROM drive can be highly improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for transmitting data recorded on a recording medium comprising:

reading file management information for managing a data recorded in a file structure in the recording medium;

storing the read file management information in a separate area of a storing unit different from an area of the storing unit in which the file-structured data is stored; and reading and transmitting a corresponding file management information as stored in the separate area of the storing unit without the file management information stored in the separate area being cleared by a clearing operation of the file-structured data, when the file management information is repeatedly requested.

2. The method according to claim 1, wherein the file management information refers to a file system data including recording position information of the data recorded in the file structure.

3. The method according to claim 1, wherein in the step of reading and transmitting, the file management information including the requested information is partially read and transmitted.

4. An apparatus for transmitting a data recorded on a recording medium, the data including a file-structured data and a management information for managing the file-structured data, and for transmitting the data through an interface to a host, the apparatus comprising:

a reading unit for reading out the data and the management information recorded in the recording medium;

a storing unit for storing the file management information read by the reading unit in a first area of the sorting unit different from a second area in which the file-structured data is stored without the file management information stored in the first area being cleared by a clearing operation of the file-structured data, when the file management information is repeatedly requested, the storing unit storing the file-structured data in the second area after the file-structured data previously stored in the second area is cleared whenever a command for reading out a data is inputted from the host; and a controller for controlling storing and reading of the file management information so that it is read out from the storing unit to be transmitted to be the host without performing an operation for reading out the file management imformation recorded on the recording medium repeatedly by the reading unit, whenever the host requests the file management information.

5. The apparatus according to claim 4, wherein the controller controls the storing unit to store the file-structured data in the second area without clearing the file management information stored in the first area of the storing unit when the host requests the file management information.

6. A method for transmitting data recorded on a recording medium, comprising the steps of:

receiving a data transfer request command from a host;

discriminating whether the command is a transfer request of a file management data for managing a file-structured data;

searching a first region of a buffer memory to identify whether the corresponding file management data is stored therein, based on the result of discriminating step;

reading the file management data from the first region of the buffer memory when the file management data is stored in the first region of the buffer memory different from an area of the buffer memory in which the file structured-data is stored, and transferring the first management data to the host; and moving a reading unit to a position on the recording medium in which the file management data is recorded, when the file management data is not stored in the first region of the buffer memory, reading the file management data from the recording medium, storing the read file management data into the first region of the buffer memory without the file management information stored in the first region being cleared by a clearing operation of the file-structured data, when the file management information is repeatedly requested, and transferring the read file management data to the host.

7. A method for transmitting data recorded on a recording medium comprising:

reading file management information for managing a file-structured data recorded in the recording medium;

storing the read file management information in a first area of a buffer memory;

determining whether a new file-structured data is read from the recording medium; and controlling the buffer memory to store the read new file-structured data into a second area of the buffer memory different from the first area of the buffer memory when the new file-structured data is read from the recording medium, and transmitting the read new file-structured data and the file management information that is stored in the first area of the buffer memory, wherein the new file-structured data is stored in the second area of the buffer memory after a previously stored data is cleared while the file management information stored in the first area is not cleared.

8. A method for transmitting a data recorded on a recording medium comprising:

reading a file-structured data and file management information for managing the file-structured data recorded in the recording medium, storing the file-structured data into a first area of a buffer memory and storing the file management information into a second area of the buffer memory, and transmitting the data to a host;

clearing the second area of the buffer memory if a command for a new file-structured data transfer is requested from the host; and storing the requested data into the second area of the buffer memory after clearing previously stored data from the second area based on the result of the reading step while the file management information stored in the first area is not cleared; and transmitting the requested data to the host.

9. The method of claim 1, wherein, in the storing unit, the storing unit is a buffer memory separate from the recording medium.

10. The apparatus of claim 4, wherein the storing unit is a buffer memory separate from the recording medium.

11. The method of claim 1, wherein, in the reading step, the recording medium is a disk.

12. The apparatus of claim 4, wherein the recording medium is a disk.

13. The method of claim 6, wherein the recording medium is a disk.

14. The method of claim 7, wherein the recording medium is a disk.

15. The method of claim 8, wherein the recording medium is a disk.

* * * * *